W. R. BUSS.
SECTIONAL CHIP BREAKER FOR PLANING MACHINES.
APPLICATION FILED DEC. 18, 1909.

954,376. Patented Apr. 5, 1910.

Witnesses
H. O. Van Antwerp
Minnie Johnson

Inventor
Wendell R. Buss
By Luther V. Moulton
Attorney

UNITED STATES PATENT OFFICE.

WENDELL R. BUSS, OF GRAND RAPIDS, MICHIGAN.

SECTIONAL CHIP-BREAKER FOR PLANING-MACHINES.

954,376.  Specification of Letters Patent.  Patented Apr. 5, 1910.

Application filed December 18, 1909. Serial No. 533,835.

*To all whom it may concern:*

Be it known that I, WENDELL R. BUSS, a citizen of the United States of America, residing at Grand Rapids, in the county of Kent and State of Michigan, have invented certain new and useful Improvements in Sectional Chip-Breakers for Planing-Machines; and I do hereby declare the following to be a full, clear, and exact description of the invention, such as will enable others skilled in the art to which it appertains to make and use the same.

Figure 1:
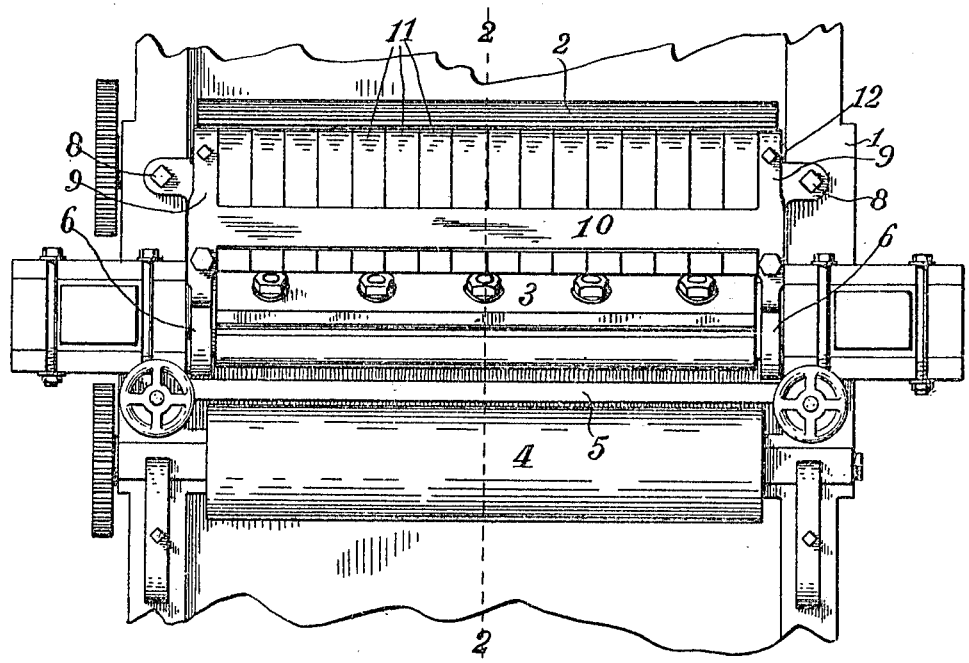
Figure 2:
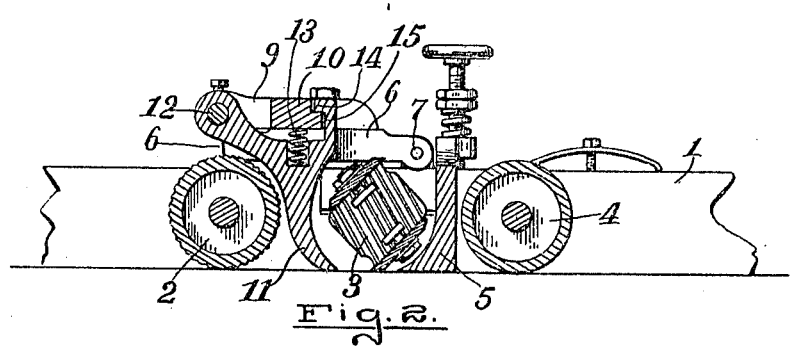
Figure 3:
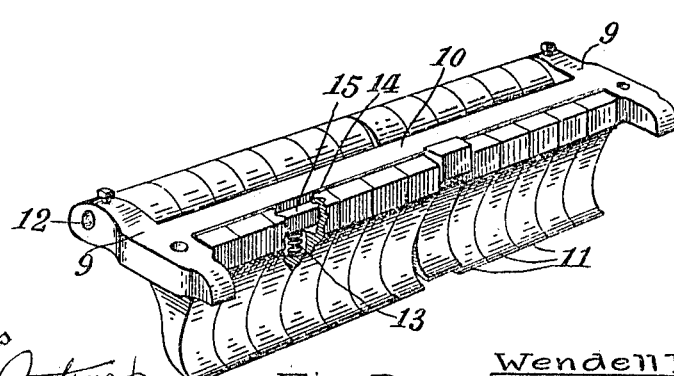

My invention relates to improvements in sectional chip breakers for planing machines, and its object is to provide the same with various new and useful features, hereinafter more fully described and particularly pointed out in the claims, reference being had to the accompanying drawings in which:

Figure 1 is a plan view of a portion of a planer with my device applied thereto; Fig. 2 a transverse section of the same on the line 2—2 of Fig. 1; and, Fig. 3 a perspective of a portion of the device detached from the machine.

Like numbers refer to like parts in all of the figures.

1 represents a portion of the frame of a planing machine; 2 the feed roller; 3 the rotary cutter or cylinder; 4 the following roller; 5 a pressure bar close behind the cylinder, these parts being of the usual construction in planing machines.

My device comprises arms 6 pivoted to the frame as at 7, somewhat in the rear of the cylinder and movable upward at the front end, being limited in their downward movement by adjustable screws 8 inserted in lugs on the arms which overhang the frame, the screws resting on the frame and supporting the arms and parts mounted thereon, when out of action, to prevent the same from dropping too low and to adjust the same to properly engage the lumber to be planed. Supported by these arms 6 about midway of their length is a rigid cross bar 10 having a T-head 9 at each end mounted upon the respective arms 6 and secured thereto. Inserted in the front ends of the T-head and parallel with the cylinder and bar 10, is a rod 12 on which are mounted a series of independently pivoted sections which collectively form a pressure bar to engage and hold down the lumber upon the bed and prevent the lumber from vibrating under the action of the cutting cylinder. These pressure bar sections are curved rearward under the cylinder and are concave adjacent thereto, and also arranged as close thereto as practical without being struck by the knives on the cylinder. These sections extend beneath the bar 10 and are each provided with a chamber or recess beneath the bar 10 in which is a spring 13, which spring presses the respective section in contact with the lumber passing beneath the same. Each section is also provided with an upward extension at the rear of the bar 10, which overhangs a shoulder 15 on the bar as at 14, whereby the downward movement of the section is limited and the sections alined, each section being independently movable upward as the lumber passes beneath the same.

In operation, each section independently engages the lumber and yields to varying thicknesses thereof, and whenever the thickness of lumber sufficiently increases so that the springs overcome the weight of the device, the whole will turn about the pivots 7, and the lower ends of the sections move substantially about the axis of the cylinder.

What I claim is:—

1. A planing machine, comprising a rigid bar having a rearwardly projecting ledge, independently movable sections beneath the same pivoted at one side and having an upwardly extended member overhanging and engaging the ledge at the other side, each section also having a recess or chamber beneath the bar, and a spring in each recess engaging the bar and yieldingly pressing the respective section downward.

2. A planing machine, comprising arms pivoted to the frame at one end, adjusting screws near the other end of the arms to adjustably support the same, a rigid bar having T-heads mounted on said arms and secured thereto, a rod in the ends of the T-heads and parallel with the bar, independently movable sections pivoted on the rod and extending downward and rearward in a curve and also extending beneath the bar, a ledge on the bar, upwardly extended members on the sections independently engaging the ledge and supporting the sections, each section also having a recess or chamber beneath the bar, and a spring in each recess or chamber engaging the bar and yieldingly pressing the section downward.

3. A planing machine, comprising arms pivoted to the frame above and at the rear of the cylinder, a rigid bar supported on the arms and having a ledge at the side adjacent to the cylinder, a rod also supported by the arms and extending parallel with the bar, independently movable sections pivoted on the rod and extending in a curve close to the cylinder, also extending beneath the bar and having an upwardly projecting member at the rear overhanging and engaging the ledge on the bar, each section also having a chamber beneath the bar, and a spring in each chamber engaging the bar and yieldingly pressing the respective section downward.

In testimony whereof I affix my signature in presence of two witnesses.

WENDELL R. BUSS.

Witnesses:
PALMER A. JONES,
H. O. VAN ANTWERP.